United States Patent
Chen

(10) Patent No.: US 8,368,359 B2
(45) Date of Patent: Feb. 5, 2013

(54) POWER MANAGEMENT UNIT FOR PORTABLE ELECTRONIC DEVICES

(75) Inventor: Chun-Po Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 323 days.

(21) Appl. No.: 12/852,575

(22) Filed: Aug. 9, 2010

(65) Prior Publication Data
US 2011/0241628 A1 Oct. 6, 2011

(30) Foreign Application Priority Data
Apr. 6, 2010 (TW) .............................. 99110649 A

(51) Int. Cl.
*H02J 7/06* (2006.01)
*H02J 7/24* (2006.01)
*H02J 7/04* (2006.01)
*H02J 7/00* (2006.01)

(52) U.S. Cl. ............ 320/163; 320/162; 307/43; 307/66; 713/300

(58) Field of Classification Search .................. 320/162, 320/163
See application file for complete search history.

(56) References Cited

U.S. PATENT DOCUMENTS

| | | | | |
|---|---|---|---|---|
| 5,627,449 A * | 5/1997 | Fujiki | ............................ | 320/106 |
| 6,201,977 B1 * | 3/2001 | Cathey et al. | .................. | 455/574 |
| 7,852,045 B2 * | 12/2010 | Matsumura et al. | ........... | 320/134 |
| 2005/0189916 A1 * | 9/2005 | Bucur | ............................ | 320/128 |
| 2006/0230293 A1 * | 10/2006 | Veselic | ......................... | 713/300 |
| 2009/0009143 A1 * | 1/2009 | Odaohhara | ..................... | 320/162 |
| 2009/0045775 A1 * | 2/2009 | Popescu Stanesti et al. | . | 320/126 |
| 2009/0066161 A1 * | 3/2009 | Lu et al. | ............................ | 307/66 |
| 2009/0206795 A1 * | 8/2009 | Stanesti et al. | ................ | 320/135 |
| 2010/0244779 A1 * | 9/2010 | Hara | ............................. | 320/152 |

* cited by examiner

*Primary Examiner* — Drew A Dunn
*Assistant Examiner* — Nathaniel Pelton
(74) *Attorney, Agent, or Firm* — Altis Law Group, Inc.

(57) ABSTRACT

A power management unit (PMU) for supplying electrical energy to a circuitry of a portable electronic device includes a power supply module, a power detection module connected to the power supply module, and a power control module connected to the power detection module and the circuitry. The power supply module includes a battery, a charge controller, and an adapter. The power detection includes a detection resistor connected to the battery, the charge controller, and the adapter. The battery or the adapter provides electrical energy to the circuitry. The adapter further charges the battery to charge the battery when it is used to provide electrical energy to the circuitry. The charge controller detects the current for charging the battery via the detection resistor, and regulates the current for charging the battery when the charging current exceeds a predetermined value.

7 Claims, 1 Drawing Sheet

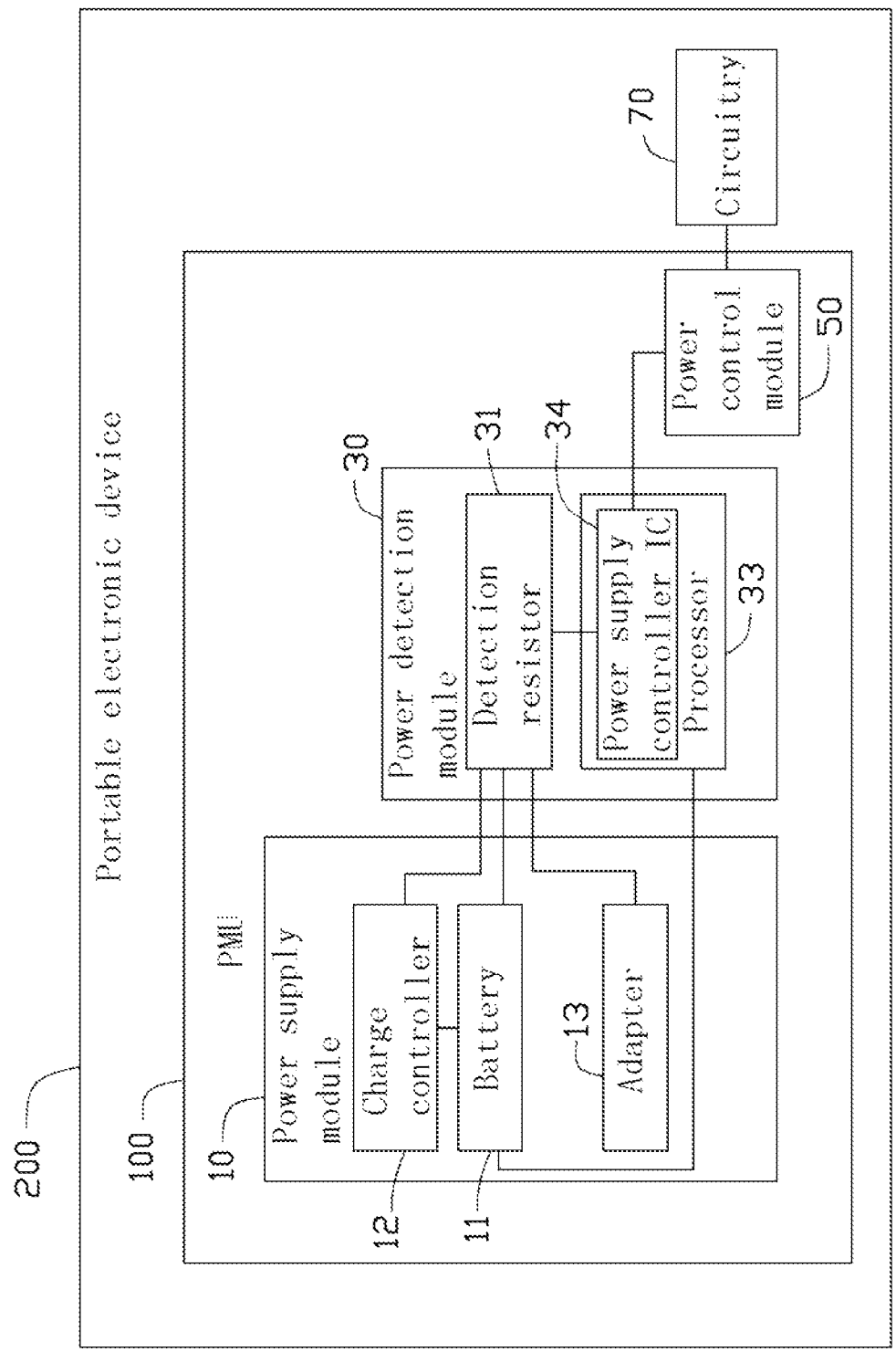

POWER MANAGEMENT UNIT FOR PORTABLE ELECTRONIC DEVICES

CROSS-REFERENCE TO RELATED APPLICATIONS

The present application is related to a U.S. patent application 12/842,135, which has been filed on Jul. 23, 2010 and entitled "POWER MANAGEMENT UNIT FOR PORTABLE ELECTRONIC DEVICES", by Chun-Po Chen. This application has the same assignee as the present application.

BACKGROUND

1. Technical Field

The present disclosure relates to power management units (PMU) used in portable electronic devices, and particularly to a PMU capable of protecting portable electronic devices from over-current.

2. Description of Related Art

Portable electronic devices are continuously required to achieve higher quality, for example, higher data processing speeds, improved display quality, and improved communication quality. However, when these functions of the portable electronic devices are enhanced, the portable electronic devices generally need to consume more power and use higher working currents. Sometimes the working currents will go too high and damage the portable electronic device, or cause the portable electronic devices to automatically switch themselves off as protection from the over-current.

Therefore, there is room for improvement within the art.

BRIEF DESCRIPTION OF THE DRAWINGS

Many aspects of the present power management unit (PMU) can be better understood with reference to the following drawings. The components in the various drawings are not necessarily drawn to scale, the emphasis instead being placed upon clearly illustrating the principles of the present PMU. Moreover, in the drawings, like reference numerals designate corresponding parts throughout the figures.

The drawing is a block diagram of a portable electronic device using a PMU according to an exemplary embodiment.

DETAILED DESCRIPTION

The drawing shows a power management unit (PMU) 100, according to an exemplary embodiment. The PMU 100 can be used in a portable electronic device 200, such as a laptop computer or a notebook computer, to supply electrical energy to a circuitry 70 of the portable electronic device 200. The circuitry 70 can include a central processing unit (CPU), a hard disk drive, a display, and other conventional components. The PMU 100 includes a power supply module 10, a power detection module 30, and a power control module 50. The power supply module 10, the power detection module 30, and the power control module 50 are electrically connected in series. The circuitry 70 is electrically connected to the power control module 50 to get electrical energy.

The power supply module 10 includes a battery 11, a charge controller 12, and an adapter 13. The battery 11, the charge controller 12, and the adapter 13 are all electrically connected to the power detection module 30, and the battery 11 is electrically connected to the charge controller 12. The battery 11 is a rechargeable battery for supplying electrical energy to the circuitry 70 through the power detection module 30 and the power control module 50. The adapter 13 can be connected to other power supplies. In use, the adapter 13 can regulate the voltage level of electrical energy provided by another power supply connected thereto to a predetermined value, and provide the electrical energy having the predetermined voltage to the circuitry 70 through the power detection module 30 and the power control module 50.

The power detection module 30 includes a detection resistor 31 and a processor 33 electrically connected to the detection resistor 31 and the power control module 50. The battery 11, the change controller 12, and the adapter 13 are all electrically connected to the detection resistor 31. The processor 33 includes a power supply controller integrated circuit (IC) 34 integrated therein. The power supply controller IC 34 can be a MAX4173F chip. The processor 33 can detect the current passing through the detection resistor 31 and control the power control module 50 to function using the power supply controller IC 34. The processor 33 is also directly connected to the battery 11 for detecting the voltage of the battery 11. The power control module 50 can regulate the working power of the circuitry 70.

When the portable electronic device 200 is used, the battery 11 can supply electrical energy to the circuitry 70 through the power detection module 30 and the power control module 50. In other embodiments, the adapter 13 can be connected to another power supply (not shown). To regulate the voltage level of electrical energy provided by the other power supply connected thereto to a predetermined value and provide the electrical energy having a regulated voltage level to the circuitry 70 through the power detection module 30 and the power control module 50, a predetermined maximal power allowed to be used by the circuitry 70 is set and stored by the processor 33. Additionally, a predetermined value of the voltage of electrical energy provided by the adapter 13 is also stored in the processor 33.

When the PMU 100 supplies electrical energy to the circuitry 70, the processor 33 uses the power supply controller IC 34 to detect the current passing through the detection resistor 31, and thus calculates the power (i.e., watt value) of the electrical energy provided to the circuitry 70 according to the detected current. If the power of the electrical energy provided to the circuitry 70 exceeds the predetermined value, the PMU 100 can decrease the power of the electrical energy provided to the circuitry 70 to protect the circuitry 70 from over-current.

If the PMU 100 is supplying electrical energy to the circuitry 70 using another power supply connected to the adapter 13, the voltage of electrical energy provided by the adapter 13 is predetermined and invariable. Therefore, the processor 33 calculates the power of the electrical energy provided to the circuitry 70 according to the current passing through the detection resistor 31 and the predetermined voltage of electrical energy provided by the adapter 13. If the PMU 100 is supplying electrical energy to the circuitry 70 using the battery 11, the voltage of the battery 11 may often vary over a range. Therefore, during detecting the current passing through the detection resistor 31, the processor 33 synchronously detects the voltage of the battery 11, and thus calculates the power of the electrical energy provided to the circuitry 70 according to the current passing through the detection resistor 31 and the voltage of the battery 11.

When the calculated power of the electrical energy provided to the circuitry 70 exceeds the predetermined value, the processor 33 controls the power control module 50 to function using the power supply controller IC 34. The power control module 50 limits the power of the electrical energy provided to the circuitry 70 (e.g., by means of driving the circuitry 70 to work in a CPU thermal throttling status), thereby decreasing the working current provided to the circuitry 70 to protect the circuitry 70 from over-current.

When the adapter 13 is connected to another power supply, the adapter 13 can also provide electrical energy of the power supply to the battery 10 through the detection resistor 31, thereby recharging the battery 11. Therefore, the adapter 13 can be used as a charging interface of the portable electronic device 200. In the charging process, the charge controller 12 detects the current charging the battery 10 by the detection resistor 31, and regulates the charging current or stops the charging process when the charging current exceeds a predetermined value. Furthermore, the charge controller 12 can also detect the voltage of the battery 10, and stop the charging process when the voltage of the battery 10 exceeds a predetermined value.

The present PMU 100 can detect the power provided to the circuitry 70 of the portable electronic device 200, and limit the power provided to the circuitry 70 when the power exceeds a predetermined value, such that the circuitry 70 is protected from over-current. It can also be used to charge the portable electronic device 200. Additionally, it has a simple structure and costs less.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A power management unit (PMU) for supplying electrical energy to a circuitry of a portable electronic device, comprising:
   a power supply module including a battery, a charge controller, and an adapter;
   a power detection module connected to the power supply module, the power detection including a detection resistor connected to the battery, the charge controller, and the adapter; and
   a power control module connected to the power detection module and the circuitry; wherein the battery provides electrical energy to the circuitry through the power detection module and the power control module, or the adapter is connected to a power supply to regulate the voltage of electrical energy provided by the power supply to a predetermined value and provide the electrical energy having the predetermined voltage to the circuitry through the power detection module and the power control module; the adapter further providing electrical energy of other supplies connected thereto to the battery through the detection resistor to charge the battery when it is used to provide electrical energy to the circuitry, the charge controller detecting the current for charging the battery via the detection resistor, and regulating the current for charging the battery when the charging current exceeds a predetermined value; and
   wherein the power detection module includes a processor connected to the detection resistor, the battery, and the power control module; the processor detects the current passing through the detection resistor and a voltage provided to the circuitry, calculates the power of the electrical energy provided to the circuitry according to the current passing through the detection resistor and the voltage provided to the circuitry;
and controls the power control module to limit the power of the electrical energy provided to the circuitry when the power of the electrical energy provided to the circuitry exceeds a predetermined value.

2. The PMU as claimed in claim 1, wherein the processor includes a power supply controller integrated circuit (IC) connected to the detection resistor and the power control module, the power supply controller IC being a MAX4173F chip, the processor using the power supply controller IC to detect the current passing through the detection resistor and control the power control module.

3. The PMU as claimed in claim 1, wherein when the battery provides electrical energy to the circuitry through the power detection module and the power control module, the processor detects the voltage of the battery and calculates the power of the electrical energy provided to the circuitry according to the current passing through the detection resistor and the voltage of the battery.

4. The PMU as claimed in claim 1, wherein when the adapter provides electrical energy to the circuitry through the power detection module and the power control module, the processor calculates the power of the electrical energy provided to the circuitry according to the current passing through the detection resistor and the predetermined voltage of electrical energy provided by the adapter.

5. The PMU as claimed in claim 1, wherein the charge controller is connected to the battery to detect the voltage of the battery, and stops the charging process when the voltage of the battery exceeds a predetermined value.

6. The PMU as claimed in claim 4, wherein a predetermined value of the voltage of electrical energy provided by the adapter is also stored in the processor.

7. The PMU as claimed in claim 1, wherein when the power of the electrical energy provided to the circuitry exceeds a predetermined value, the processor controls the power control module to function, and the power control module drives the circuitry to work in a CPU thermal throttling status to decrease current provided to the circuitry.

* * * * *